United States Patent [19]

Hoffmann et al.

[11] Patent Number: 4,817,883

[45] Date of Patent: * Apr. 4, 1989

[54] MEASURING DEVICE FOR THE PRESSING ZONE WIDTH OF A ROLLER ON A ROLL OF MATERIAL AND PROCESS AND CONTROLLER FOR MAKING THE ROLL WITH A PREDETERMINED ROLL HARDNESS

[75] Inventors: Peter Hoffmann, Korschenbroich; Gerhard Buschmann, Düsseldorf; Hans Leichter, Neuss; Ewald G. Welp, Erkrath, all of Fed. Rep. of Germany

[73] Assignee: Jagenberg Aktiengesellschaft, Dusseldorf, Fed. Rep. of Germany

[*] Notice: The portion of the term of this patent subsequent to Jun. 30, 2004 has been disclaimed.

[21] Appl. No.: 40,943

[22] Filed: Apr. 21, 1987

[30] Foreign Application Priority Data

Apr. 29, 1986 [DE] Fed. Rep. of Germany ....... 3614436

[51] Int. Cl.$^4$ .......................... B65H 17/08; G01N 3/40
[52] U.S. Cl. ...................................... 242/66; 242/75.2; 73/78
[58] Field of Search ...................... 73/78, 159; 242/66, 242/65, 75.2

[56] References Cited

U.S. PATENT DOCUMENTS

| | | | |
|---|---|---|---|
| 3,599,889 | 8/1971 | Pfeiffer | 242/66 |
| 3,837,593 | 9/1974 | Dorfel | 242/66 |
| 4,535,950 | 8/1985 | Lisnyansky | 242/66 |
| 4,598,877 | 7/1986 | Oinonen | 242/66 |
| 4,676,094 | 1/1987 | Hoffman et al. | 73/78 |

FOREIGN PATENT DOCUMENTS 3546480  4/1986  Fed. Rep. of Germany .

Primary Examiner—Stuart S. Levy
Assistant Examiner—Steven M. DuBois
Attorney, Agent, or Firm—Herbert Dubno

[57] ABSTRACT

The invention comprises a measuring device and method for the pressing zone width pressure per unit area of this zone and/or additional characteristic variables of a roll of material depending on the pressing surface area. A time interval measured directly or indirectly in which the distance a sensor from the roll of material is either above or below a certain limiting value is obtained by a plurality of sensors positioned on the surface of a roller pressed against the roll. The pressing zone width is automatically computed from this time interval and the speed of the web of sheet material and, if necessary, additional information including the radius of the roll, the weight of the roll of material and the like. The winding of the sheet of material is controlled based upon the ascertained pressing zone width. The pressing zone width and thus also the roll hardness is controlled according to a program by at least a portion of the parameters determining the hardness, these variables or parameter including the geometry of the winding device, the advance of the rollers, (i.e. the angle which the plane through the axis of the roller and the axis of the roll makes with the vertical) the tension on the web of sheet material and/or the pressure of the press roller.

8 Claims, 2 Drawing Sheets

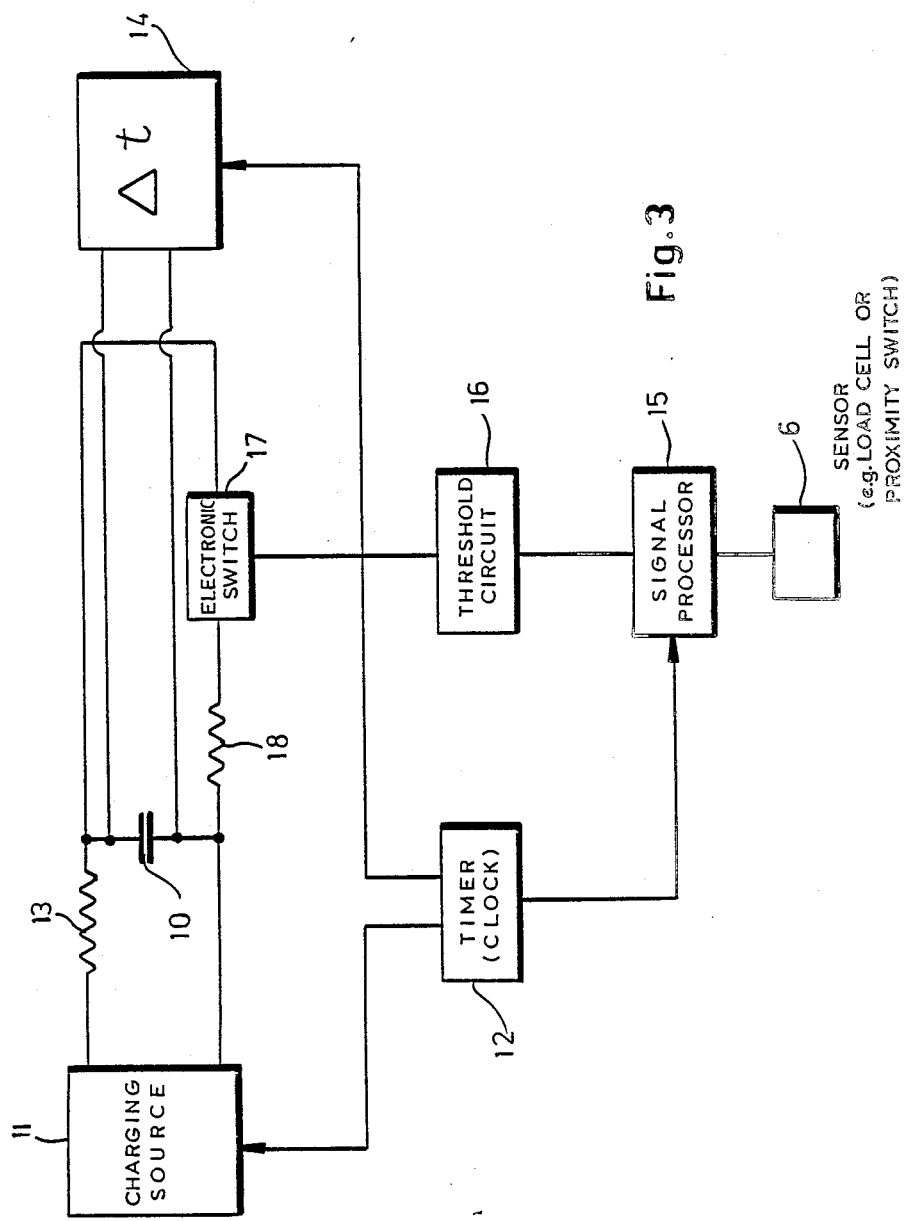

MEASURING DEVICE FOR THE PRESSING ZONE WIDTH OF A ROLLER ON A ROLL OF MATERIAL AND PROCESS AND CONTROLLER FOR MAKING THE ROLL WITH A PREDETERMINED ROLL HARDNESS

CROSS-REFERENCE TO RELATED APPLICATION

This application is related to the commonly assigned copending application Ser. No. 853,359 filed Apr. 17, 1986 in the names of three of us now U.S. Pat. No. 4,676,094.

FIELD OF THE INVENTION

Our present invention relates to a measuring device for measuring the pressing zone width and/or the pressing force per unit area of this zone of a roller on a roll wound from a web of sheet material, e.g. paper, and, more particularly, to a measuring device for the pressing zone width and/or the pressing surface area between a supporting, feed or press roller and such a roll of material. It also relates to a process and controller for winding up a web of sheet material with an accurate predetermined roll hardness.

BACKGROUND OF THE INVENTION

In the aforementioned application (see also the corresponding German Patent Application P 35 14 041), there is described a measuring device for the width of the pressing zone and/or the pressing surface area of a roller, especially a feed roller, on a roll of material wound from a web of sheet material, e.g. paper.

In this measuring device, radiation sources are located in the surface of the roller whose radiation is directed toward the roll of material and a radiation detector is located to detect the radiation reflected from the roll of material.

The pressing zone width and/or the pressing surface area of the roll of material is determined with a computer or signal analyzer from the interruption of the output from the radiation detector during the covering of the radiation source by the roll of material and a signal fed from a sheet speed measuring device. The computer can also consider additional parameters determining the roll hardness in calculating the correction factor for the winding operation, including the radius of the roll of material, the roll weight, the length of the roll, the sheet material specific weight (weight per unit area) and the geometry of the winding device.

OBJECTS OF THE INVENTION

It is an object of our invention to provide an improved measuring device for the pressing surface width between a roller and a roll of material made from a sheet of material, which extends the principles of the aforementioned application.

It is also an object of our invention, to provide an improved process and an improved controller for winding a web of sheet material using a measuring device for the pressing zone width of a roller on a roll of material whereby the roll hardness is controllable.

SUMMARY OF THE INVENTION

These objects and others which will become more readily apparent hereinafter are attained, in accordance with our invention, in a measuring device and method for measuring the width of a pressure zone and/or the pressing surface area between a roll of material wound from a web of sheet material and a roller pressed against the roll, particularly a supporting, feed or press roller, a controller being provided to control the roll hardness at least in part with the zone width as thus measured.

According to our invention, at least one sensor located in the surface of the roller supplies a signal to a computer for a time interval $\Delta t$ in which the distance to the roll of material is under or over a certain limiting value. The pressing-zone width of the roll of the material is ascertained from that signal and from a speed obtained from a speed-measuring unit and from the radius, the weight and the length of the roll of the material, the specific weight of the sheet of material and the geometry of the device for winding up the web of sheet material.

As in the aforedescribed application, the width of the flattened zone on the roll is determined by a computer from the time interval $\Delta t$ which is a measure of the flattening and also the roll hardness of a roll of material.

The measuring device according to our invention, however, is not limited here to a special type of sensor, e.g. a radiation source/detector, but can include any sensors which respond to a distance to or spacing from the roll of material. Also the invention is not limited to the direct detection of the time interval $\Delta t$. This time interval $\Delta t$ can be determined indirectly as well. For example, a change in state of a detector can be detected and the time interval $\Delta t$ can be ascertained from that. Specifically, the charge in a condenser partially discharged from a predetermined constant value can be determined during the time interval. Since the discharge curve is always the same, the value of that charge (measured by the potential on the capacitor) corresponds to a definite time interval.

Advantageously, the pressing surface area and/or the roll hardness and/or the sheet extensibility and/or the web tension and/or the specific density of the turns of the sheet material are determined at least partially, from the pressing zone width and additional sheet material dependent variables, since definite formal relationships exist between the pressing zone width and these variables.

Since as is known, the roll hardness can vary over the width of the unit and during the winding up thereof, in one form of our invention, a plurality of sensors are located on the surface of the roller along the length of the roll of material. A distribution of these sensors over the circumference of the surface of the roller is likewise possible. With this form of our invention, the roll hardness distribution can be measured along the length or over the circumference of the roll.

The roll hardness of a roll depends on a variety of factors and can be influenced by different events. Of course, this knowledge has been used in the past to influence the roll hardness of the roll to a certain extent. However, it has not been possible to control every roll hardness with precision, because only the experience obtained from past winding up processes could be used.

Our invention also includes a process for winding up a web of sheet material into a roll of material in a winding or coiling device which includes particularly a plurality of feed and supporting rollers in a crotch of which the roll is wound, e.g. on a core sleeve, and if necessary, a pressing roller and which utilizes a measuring device for the pressing zone width or the pressing surface area or a related variable. In this process, at least one parameter determining the roll hardness like the geometry of the roll device, the advance of the rollers, the force on the sheet of the material, the pressure exerted on the roll of the material is controlled according to a program depending on the pressing zone width and/or another characteristic variable of the roll of material depending on the pressing zone width such as the pressing surface area.

Advantageously, in controlling the roll hardness, sheet material dependent correction variables, such as sheet material cross section, mass distribution and moisture distribution are taken into consideration. These correction variables are either determined from the measurement or deduced from the records of the manufacture of the sheet material, e.g. paper.

In the process according to our invention, the possibility of direct determination of the pressing zone width and/or the roll hardness during winding is utilized to act on the most widely divergent factors influencing roll hardness, to correct the winding process so that each roll is kept at the desired roll hardness throughout the winding process.

Differences in the cross section of the sheet of material, e.g. in a paper sheet which has a varying thickness over its width, can be detected with a plurality of sensors distributed over the length of the roller on its surface.

A pressing roller comprising a plurality of individually controllable segments can be provided for control of the roll hardness over the length of the roll.

According to our invention, a control device for the roll hardness of a roll of material to be rolled up from a web of sheet material utilizing a measuring device comprises a controller which receives the actual value of the roll hardness obtained from the measuring device. After that, an adjusting signal is supplied to an adjusting member, advantageously a driven press roller, of at least one part of the winding device with which the roll hardness can be varied.

BRIEF DESCRIPTION OF THE DRAWING

The above and other objects, features and advantages of our invention will become more readily apparent from the following description, reference being made to the accompanying highly diagrammatic drawing in which:

FIG. 3 is a block diagram of a portion of a circuit for detecting $\Delta t$ as described.

SPECIFIC DESCRIPTION

Figure 1:
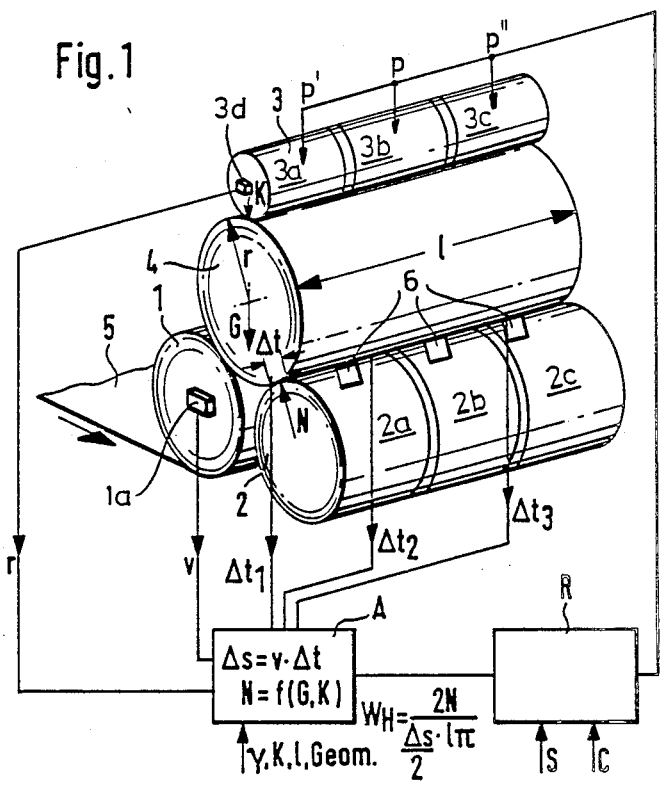
FIG. 1 is a partially perspective, partially diagrammatic view of a measuring device for the pressing zone width and controller according to our invention for the roll hardness in a winding device.

The roll-winding device shown in the drawing comprises two feed and support rollers or drums 1 and 2 and a press roller 3. A roll of material 4 is clamped between these three rollers 1 to 3. A web of sheet material 5 to be rolled up runs over one of the driven feed rollers 1 or 2, i.e. the roller 1 which has a sensor 1a outputting a signal representing the velocity v of the web 5.

The press roller 3 presses with its own weight on the roll of material 4. This load is, however, superposed on an adjustable force P acting on the press roller 3 so that the entire load K acts downwardly on the roll 4.

The supporting force N on the feed rollers 1 and 2 (and conversely the compressing force applied by them to the roll 4) depends on the weight of the press roller 3 and the force P and the weight G of the roll of material 4 which becomes larger when the radius r of the roll of material 4 increases. Furthermore, the supporting force N depends on the geometric arrangement of the winding device and, of course, on the spacing of the feed rollers 1 and 2, their radius, a possible height displacement and the radius r of the roll of material 4.

Specifically, $N = f(G,K)$ where N is approximately equal to $$1/2\{(2\pi r\gamma l) + K\}\cos\alpha$$

where $\alpha$ is the angle included between the vertical and a plane defined by the axis of the roll 4 and one of the rolls 1,2 (i.e. a winder geometry factor), $\gamma$ is the weight per unit area of the web (specific weight) l is the length of the roll and r is the radius of the roll.

The variable signals r for the roll radius of the roll of material 4 and v for the speed of the sheet of material 5 can be determined by a signal transmitter which detects the position of the press roller 3 and the sensor 1a for the rotation speed of one of the feed rollers 1 and 2. These signals are supplied to a computer A.

To detect the width of the zone experiencing the pressure or the pressing zone width (in the circumferential direction on the roll 4) a plurality of sensors are located on the surface of the feed roller 2 (FIG.1) distributed axially over the length of the feed roller 2 which provides the signals $\Delta t_1$, $\Delta t_2$, and $\Delta t_3$ to the computer A. These signals can differ when the feed roller 2 is segmented, that is divided into a plurality of roller segments 2a, 2b and 2c. Then the pressing zone width can be measured for each of these segments.

Figure 2:
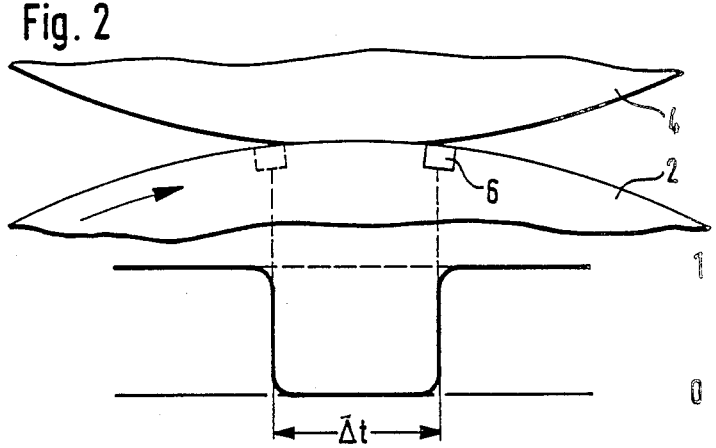
FIG. 2 is a partially cutaway cross sectional view through the measuring device for the roll hardness of a roll of material according to our invention with an accompanying graph.

The arrangement of a sensor 6 in the surface of the feed roller 2 together with the pulse signal produced by its is illustrated in FIG. 2. A great variety of different sensors can be used as sensor 6 inasmuch as they only need to respond to the proximity of the roll 4.

The operation of the sensor 6 is as follows: The sensor 6, as soon as it reaches the position indicated with dashed lines, switches so that the signal changes from 1 to 0 on rotation of the feed roller 2 in the direction of the arrow. This signal state is maintained for the duration of the pulse, $\Delta t$, until the sensor reaches the position indicated in FIG. 2 in which it is shown with solid lines. Both at the position on the left in FIG. 2 in which the sensor 6 is indicated with dashed lines and in the position indicated on the right in FIG. 2 in which the sensor 6 is indicated with solid lines the sensor 6 is at a position which corresponds to a limiting value in which the sensor responds or transmits a signal.

A pulse of duration $\Delta t'$ can be detected instead of a pulse of $\Delta t$, which corresponds to the circumferential region in which the sensor 6 has moved into the interval beyond the limiting positions on the roll 4 at which the sensor 6 responds. While in the first case the signal $\Delta t$ corresponds directly to the width of the flattened region of the roll 4, the signal $\Delta t'$ corresponds to the circumference of the roll 4 minus the width of the flattened region of the roll 4. In each case, one obtains a measurement of the pressing zone width.

From the obtained pulse duration Δt and the signal speed v of the sheet of material, the pressing zone width can be calculated according to the formula $\Delta s = v \cdot \Delta t$.

The roll hardness $W_H$ can be calculated from the expression $$W_H = \{(2 \cdot N)/(\Delta s/2 \cdot l \cdot \pi)\}$$

where $N = f(G,K)$ where N is the supporting force, K is the pressing force of the press roller 3 on the roll 4, and l is the length of the roll 4. Thus the roll hardness is calculable from other factors including the roll radius r, the length l of the roll, the force K of the press roller 3 on the roll of material 4, the specific weight $\gamma$ of the sheet of material, and the geometry of the roll device.

In the supporting force N the press force K of the press roller 3, the specific weight $\gamma$ of the sheet of material and the geometry of the roll device enter as constants. In a corresponding way, considering other sheet material variables, other characteristic quantities for the roll of material can be determined according to other formulas.

The roll hardness determined in this way is fed to the controller R as an actual or measured value. The controller R supplies an adjusting signal for adjustment of the force P acting on the press roller 3. The desired value S of the roll hardness depending on the radius r of the roll 4 can be provided in a program to the controller R. Furthermore, the sheet material dependent correct value C can be fed to the controller R as well as the mass distribution and the moisture distribution. The press force P is set by the controller R considering all these variables.

It is understood that with sensors 6 distributed over the length of the roll (FIG. 1), the controller R supplies an individual adjusting signal for the individual segments 3a, 3b, and 3c of the press roller 3. The press roller 3 of course can be considered as being made up of a plurality of individual segments 3a, 3b and 3c. The press roller 3 is then one example of an adjusting member used to control the pressing zone width.

The roll hardness is not only influenced by the press roller 3 but also by other factors such as the advance of the feed rollers 1,2 and the geometry of the entire device, which can be changed automatically, is desired.

The circuit of FIG. 3 shows how Δt may be detected using a capacitor 10. The latter is connected in a charging circuit with a charging voltage source 11, triggered periodically by the clock 12, and a resistor 13. The voltage on the capacitor in monitored by sensor 14, which can be a timer whose output is switched between 1 and 0 as the voltage on the capacitor 10 falls from its fixed, fully charged state, the elapsed time representing the width of the pressure zone. The sensor 6 can be a proximity switch whose analog output is applied through a signal processor 15 (e.g. an amplifier) to a threshold circuit 16 (e.g. a schmitt trigger) which operates an electronic switch 17 discharging the capacitor through the resistor 18. The decay of the charge on the capacitor 10 thus represents the duration Δt. The threshold circuit 16 provides the limiting value which the detector output must exceed or drop below to commence timing Δt.

We claim:

1. A winder apparatus for rolling a web of material, comprising:
    support rollers carrying a roll wound from a web of material;
    a pressing roller bearing upon said roll so that said roll has a pressing zone width in contact with one of said rollers forming one web-rolling parameter and with a pressing surface area forming another web-rolling parameter; and
    a measuring device for measuring at least one of said parameters, said measuring device comprising:
        at least one sensor received in a surface of said one of said rollers for generating a signal Δt for a time interval during which a distance of said sensor from said roll is above or below a limiting value,
        speed-measuring means for detecting a speed of said web and generating a signal v representing said speed,
        means for measuring a radius of said roll as it is wound, thereby generating a signal r representing said radius, and
        a computer connected to said sensor, said speed-measuring means, and to said means for measuring said radius and receiving said signals Δt, v and r for producing an output representing said one of said parameters.

2. The winder apparatus defined in claim 1, further comprising:
    means for inputting to said computer further signals representing a length l of said roll, a specific weight $\gamma$ of said material, and geometry of the winder apparatus.

3. The winder apparatus defined in claim 2 wherein said computer is constructed, programmed and arranged to produce an output representing at least one of the further parameters: hardness of said roll, extensibility of said web, web tension and specific density of said roll.

4. The winder apparatus defined in claim 1 wherein a plurality of said sensors are located in said surface of said one of said rollers and are distributed over the length thereof.

5. A method of rolling a web of material in a winder apparatus, comprising the steps of:
    feeding a web of material to a roll carried by support rollers;
    pressing against said roll with a pressing roller bearing upon said roll so that said roll has a pressing zone width in contact with one of said rollers forming one web-rolling parameter and with a pressing surface area forming another web-rolling parameter; and
    measuring at least one of said parameters by:
        detecting with at least one sensor received in a surface of said one of said rollers a distance of which said sensor said roll for generating a signal Δt for a time interval during which a distance of said sensor from said roll is above or below a limiting value,
        detecting a speed of said web and generating a signal v representing said speed,
        measuring a radius of said roll as it is wound, thereby generating a signal r representing said radius, and
        automatically generating from said signals Δt, v and r an output representing said one of said parameters.

6. The method defined in claim 5, further comprising the steps of:
    inputting to a computer generating said output further parameters representing a length l of said roll, a specific weight $\gamma$ of said material, and geometry of the winder apparatus; and controlling at least one winding parameter from roll hardness, tension on said web, and pressure exerted on said roll by a pressure roller according to a program.

7. The method defined in claim 6 wherein, in controlling said roll hardness, web material dependent correction variables including web material cross section, mass distribution and moisture distribution are inputted into said computer.

8. The improvement according to claim 7 wherein said pressing zone width of said roll is measured segmentwise and influences said roll hardness individually on each roll segment over the length of said support rollers.

* * * * *